J. CUNNINGHAM.
RESILIENT WHEEL.
APPLICATION FILED JUNE 30, 1919.
1,373,652.
Patented Apr. 5, 1921.
2 SHEETS—SHEET 2.
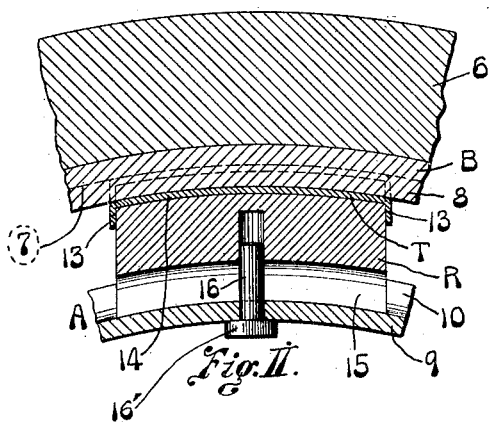
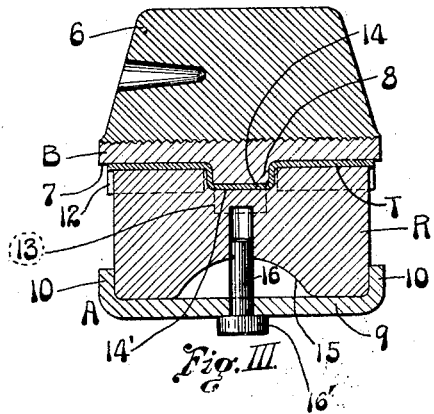
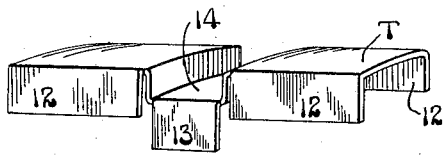
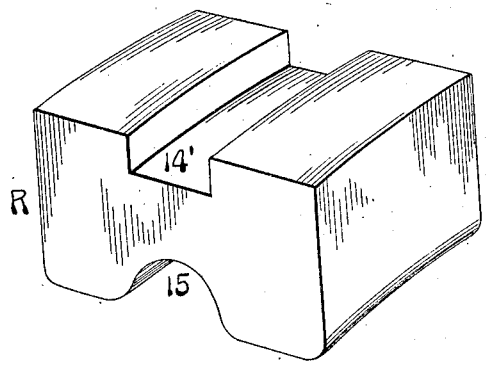
INVENTOR.
James Cunningham
BY
ATTORNEYS

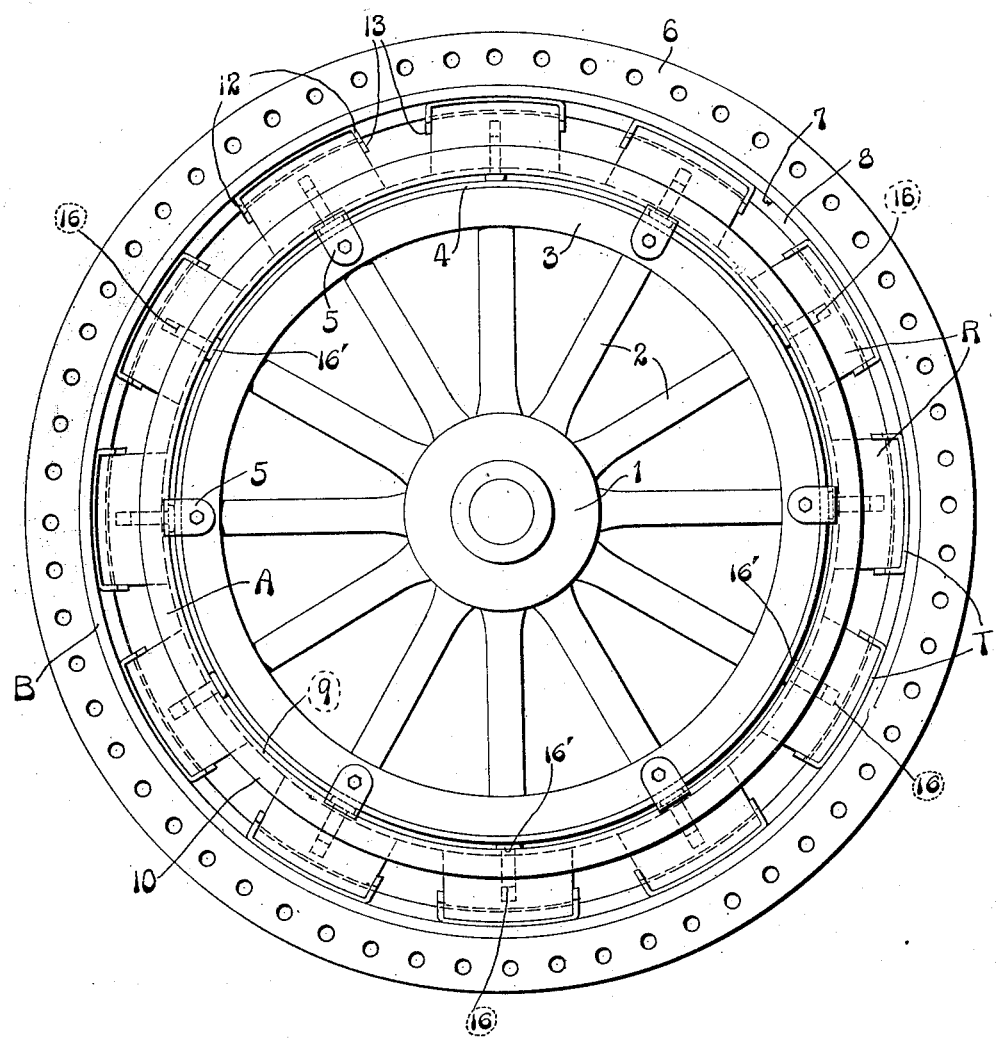

UNITED STATES PATENT OFFICE.

JAMES CUNNINGHAM, OF ST. LOUIS, MISSOURI, ASSIGNOR TO DEMOUNTABLE SPRING TIRE COMPANY, OF NEW YORK, N. Y., A CORPORATION OF MISSOURI.

RESILIENT WHEEL.

1,373,652.  Specification of Letters Patent.  Patented Apr. 5, 1921.

Application filed June 30, 1919. Serial No. 307,619.

*To all whom it may concern:*

Be it known that I, JAMES CUNNINGHAM, a citizen of the United States of America, a resident of St. Louis, in the State of Missouri, have invented certain new and useful Improvements in Resilient Wheels, of which the following is a full, clear, and exact description, reference being had to the accompanying drawings, forming a part of this specification.

My invention relates to improvements in resilient wheels, and more particularly to a resilient wheel having shock absorbers interposed between inner and outer wheel rims. One of the objects of the invention is to produce a resilient wheel having its rims so constructed that dirt, rocks, and the like, entering the space between the rims, will be quickly discharged therefrom. More specifically stated, an object is to produce a wheel of this kind having shock absorbers in the form of friction clutches adapted to creep along an annular track formed by one of the rims, thereby permitting the inner rim to turn faster than the outer rim.

To prevent the friction clutches from moving transversely of the annular track, said track is preferably provided with an annular retaining rib which extends into recesses formed in the friction clutches. The annular retaining rib receives the side thrusts, or lateral thrusts, tending to displace the friction clutches from the annular track, and said rib does not in any way prevent the discharge of rocks, or the like, from the annular track.

Another object is to simplify the resilient clutches through which rotary motion is transmitted from one of the wheel rims to the other.

Figure I is a side elevation of a vehicle wheel embodying the features of this invention.

Fig. II is an enlarged fragmentary section, illustrating one of the yielding clutches between the inner and outer rims.

Fig. III is a transverse section taken approximately through the center of the structure shown in Fig. II.

Fig. IV is a perspective view of one of the traction shoes.

Fig. V is a perspective view of one of the rubber blocks whereby the traction shoes are forced onto an annular track.

The wheel shown in Fig. I comprises a hub 1, spokes 2, a felly 3 and a metal band 4 surrounding the felly to receive a demountable rim. 5 designates fastening devices of a well known type adapted to secure a demountable rim to the wheel. The wheel is thus equipped to receive a demountable rim, and it may be considered as a standard automobile wheel.

The resilient demountable tire comprises an inner rim A adapted to be secured by the fastening devices 5, an outer rim B surrounding said inner rim, and a rubber tire 6 which is preferably vulcanized on the outer rim.

The outer rim B also includes a continuous unobstructed annular track 7 facing the inner rim, and an annular retaining rib 8 extending from the middle portion of said annular track so as to divide said track into two annular track elements, one at each side of said annular retaining rib 8.

The inner rim A may be in the form of a channel consisting of an annular web 9 and annular side flange 10 extending outwardly from said web.

An annular row of resilient expanding clutches is arranged circumferentially of the annular track 7 and interposed between the inner and outer wheel rims to form a yielding frictional connection which allows the inner rim to turn, or creep, relative to the outer rim. Each of these resilient clutches preferably comprises a rubber pressure exerting block R, and a traction shoe T secured to said rubber block and engaging the annular track 7. Each traction shoe T may be a simple sheet metal member conforming to the curvature of the annular track 7, and interposed between and contacting with said track and a rubber block R.

Abrupt flanges 12 and 13 extending from the traction shoe T engage opposite end faces of a rubber block R so as to positively transmit circumferential movement from the rubber to the traction shoe. Each traction shoe T has a recessed middle portion 14 forming a bridge which extends across the annular retaining rib 8 and coöperates with the side faces thereof to prevent lateral displacement of the traction member. The bridge, or recess, 14 may be easily formed by bending the middle portion of the sheet metal traction shoe T, as shown in Figs. III and IV.

The outer face of each rubber block R is provided with a circumferential recess 14' (Fig. V) for the reception of the bridge 14 formed on a traction shoe T. The middle portion of each rubber block is also provided with an open recess 15, formed circumferentially of the inner rim A, so as to provide a yielding bridge across the middle portion of said inner rim. The simple rubber blocks R, recessed as shown at 15, constitute very desirable shock absorbing elements. The side margins of these blocks are firmly seated on the inner rim, while their middle portions are comparatively free to yield in response to the shocks. Radial pins 16, extending from the inner rim, project into the blocks of rubber, as shown in Figs. I and II so as to secure the rubber to the inner rim, thereby preventing the rubber from slipping circumferentially of the inner rim.

The rubber blocks R are assembled between the rims under pressure, and theoretically the pressure exerted by the rubber should be great enough to support the normal load of the vehicle, but in actual practice the inner rim may be forced downwardly a slight distance by the weight of the vehicle and its contents so as to occupy a position eccentric to the outer rim. If the initial, or normal, pressure of the rubber is great enough, the load will be supported by the wheel without materially displacing or bending the rubber, and in this event the bodies of rubber will not be subjected to injurious constant flexure when the vehicle is traveling over a smooth roadway.

At the upper end of the wheel, the friction clutches formed by the rubber members and traction shoes are comparatively free, and there being no positive driving connection between the inner and outer rims, the free individual resilient clutches are permitted to move or creep circumferentially of the annular track 7. In one revolution the circumferential slippage is very slight, but in traveling several miles the total slippage may amount to one or more complete revolutions, depending upon the conditions under which the wheel is driven.

Lateral displacement of the shock absorbers is prevented by the side flanges 10 (Fig. III) engaging the side faces of the rubber blocks, and also by the bridge 14 formed at the middle of each traction shoe to engage the sides of the annular retaining rib 8. By using the rib 8 to prevent lateral displacement, I also prevent rocks and other objects from remaining in the space between the rims. Centrifugal force will throw such objects outwardly from the rim, and the retaining rib 8 will not interfere with the discharge of rocks, and the like, from the annular track 7.

The radial pins 16 are removably mounted in the inner rim, so the blocks of rubber can be easily assembled in the space between the inner and outer rims. Each pin 16 passes through a hole in the inner rim, and when the rim is applied to a wheel, a head 16' on each pin lies between the inner rim and the metal band 4 on the felly. The heads 16' are thus confined between the inner rim and the band 4 to retain the pins 16 in proper engagement with the rubber blocks when the tire structure is mounted on a wheel. In assembling the rubber blocks, the pins 16 are inserted after the blocks are mounted between the inner and outer rims, and it will be apparent that these pins can be easily removed to permit removal of the rubber blocks.

I claim:

1. In a resilient wheel, the combination of an inner rim, an outer rim surrounding said inner rim, one of said rims being provided with an annular track facing the other rim, an annular retaining rib extending from said annular track, and an annular row of resilient expanding clutches arranged circumferentially of said annular track and interposed between said rims to form a yielding frictional connection which allows one of said wheel members to turn faster than the other, said resilient clutches being adapted to creep along said annular track, and said clutches being provided with recesses for the reception of said annular retaining rib, whereby the clutches are retained on said annular track.

2. In a resilient wheel of the character described, an inner rim, an outer rim surrounding said inner rim, one of said rims having a continuous unobstructed annular track facing the other rim and an annular retaining rib extending from said annular track so as to divide said track into two annular track elements, one at each side of said annular retaining rib, and an annular row of resilient clutches interposed between said rims to form a yielding frictional connection which allows the inner rim to turn faster than the outer rim, said resilient clutches comprising relatively firm traction members adapted to creep along said annular track elements and yielding members to which said relatively firm traction members are secured, and said relatively firm traction members being provided with recesses for the reception of said annular retaining rib, whereby said traction members are retained on said annular track elements.

3. In a resilient wheel, an inner rim, an outer rim surrounding said inner rim, one of said rims being provided with a continuous unobstructed annular track facing the other rim, and an annular row of resilient clutches arranged circumferentially of said annular track and interposed between said rims to form a frictional connection which allows the inner rim to turn faster than the outer rim, said resilient clutches comprising rubber blocks secured to one of said rims and sheet metal traction shoes interposed between said rubber blocks and the annular track so as to frictionally engage said track, and each of said sheet metal traction shoes having abrupt marginal flanges engaging opposite end faces of one of said rubber blocks, so as to positively transmit circumferential movement from the rubber block to the traction shoe.

In testimony that I claim the foregoing I hereunto affix my signature.

JAMES CUNNINGHAM.